3,528,927
LASERABLE GLASS MATERIAL
Robert E. Graf, Southbridge, Mass., and Robert W. Young, Woodstock, Conn., assignors to American Optical Corporation, a corporation of Delaware
Filed Nov. 10, 1964, Ser. No. 410,126
Int. Cl. C09k 1/54; C03c 3/28, 3/10
U.S. Cl. 252—301.6
8 Claims

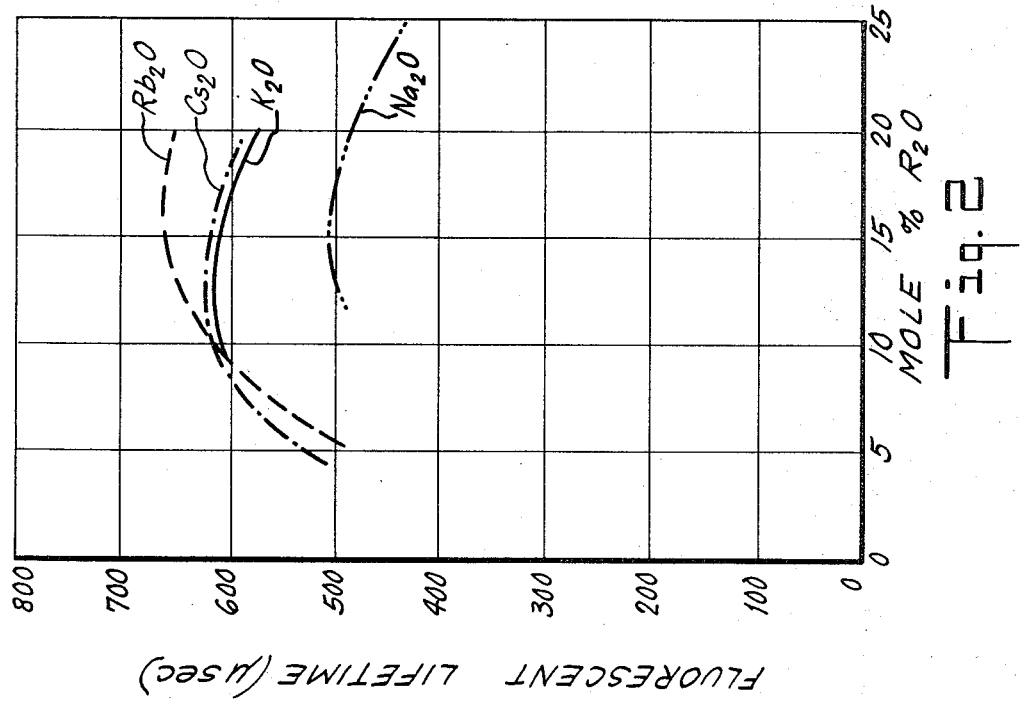
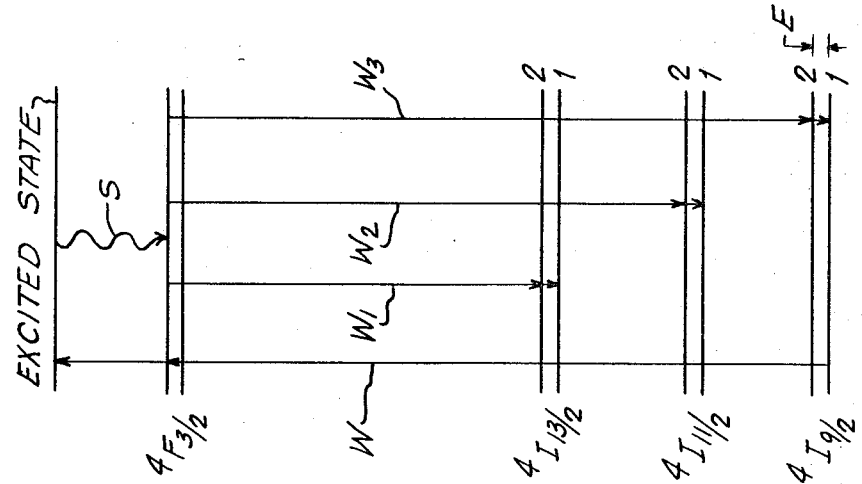
INVENTORS
ROBERT E. GRAF
ROBERT W. YOUNG
*John A. Hardy*
ATTORNEY United States Patent Office 3,528,927
Patented Sept. 15, 1970

ABSTRACT OF THE DISCLOSURE

In laserable materials having an active ingredient in a glassy host material of silicate glass, increased fluorescent lifetimes are attained by the substitution of lighter sodium ions by heavier monovalent alkali ions and heavier divalent metal ions such as barium, lead and cadmium. However, fabrication is made more difficult by high viscosity of the molten glass. The viscosity may be reduced while still attaining increased fluorescent lifetime by using a combination of the heavier potassium alkali ion with ions of sodium or lithium and mixtures of the two.

---

Related patent applications are patent application Ser. No. 410,209, filed concurrently herewith and patent application Ser. No. 168,012, filed Jan. 16, 1962, each of said applications being assigned to the assignee of the present application.

The present invention relates to laserable materials suitable for fabrication of laser elements or components and, more particularly, to such materials having non-crystalline atomic structure with the numerous known advantages attendant thereto. In greater particularity, the invention relates to laserable materials of a silicate glass type and which incorporate heavy monovalent alkali ions for improved fluorescent lifetimes.

A neodymium-containing laserable material of non-crystalline atomic structure possesses numerous virtues in the fabrication of laser elements or components, and the latter exhibit many well known desirable operational characteristics. In many laser applications, it is desirable that a large amount of energy be stored in the form of excited ion states. The lifetime for fluorescent emission plays a significant role in the amount of energy storage which may be attained in a given volume of laserable material, and any increase of lifetime is therefore highly beneficial for increased energy storage. Maximized energy storage is particularly desirable in so-called Q-switching resonant laser structures or where large-amplitude relaxation oscillations are to be generated.

The Q of a laser resonant cavity structure is a measure of the ratio of energy storage to energy dissipation per light cycle. Q-switching may be accomplished by a control device interposed in, or terminating an end of, a light propagation path extending through the laser element. The control device is so operated as normally to establish a low value of Q in the resonant cavity until laser action is desired, after which the control device quickly increases the value of Q to permit the stored energy of the laser element to be rapidly extracted as light energy emission. The amount of energy storage is related to the difference between the number (i.e. "population") of excited ions in an upper energy level and the number or population of unexcited ions present in or remaining at a lower energy level. When the population of the upper energy level exceeds that of the lower energy level upon which an emissive transition terminates, an operative condition conveniently referred to as a population inversion prevails. The minimum value of population inversion M required for laser action to begin is experssed by the relation:

$$M\alpha\tau/Q \tag{1}$$

where $\tau$ is the radiative lifetime of the fluorescing ion.

Radiative lifetime may be expressed as the reciprocal of the probability of radiative transition from an excited level to a lower energy level within one unit of time. It will be evident from the relation just expressed that, for a given value of $\tau$, decreasing the value of Q enables more energy to be stored in the inverted ions of a given volume of the laserable material before laser action can begin; and further that the quantity of energy which can be stored, for any value of Q, is increased by increasing the fluorescent lifetime $\tau$. When the laserable material is irradiated with light energy of appropriate wavelength, each ion which absorbs a photon of light energy is excited from a lower to a higher energy level and then usually experiences a non-radiative transition to an intermediate energy level where the net resultant energy remains stored in the excited ion. The total energy that can be stored in intermediate energy-level excited ions is roughly proportional to the photonic energy absorbed in a time equal to the fluorescent lifetime of the laserable material. While the total stored energy can thus be increased by increase of the intensity of the radiating light energy, the maximum intensity of conventional light sources is limited for well known reasons. Prolonged duration in the application of the irradiating light energy to the laserable material is of no avail in increasing the energy storage for the reason that the fluorescent lifetime establishes a limit on the maximum energy which can be stored before laser action begins as noted above. Accordingly, any increase of fluorescent lifetime of the laserable material contributes an important increase in the amount of energy storage obtainable from conventional irradiation light sources.

A co-pending patent application Ser. No. 410,209 (Docket 5403), filed concurrently herewith, entitled Laserable Material, and assigned to the same assignee as the present application, discloses a laserable material having substantially increased fluorescent lifetimes attained by use of the heavier monovalent alkali ions and heavier divalent metal ions in silicate glass compositions incorporating neodymium as the active laser ingredient. The oxides of the heavier alkali ions are desirably used in relatively large weight percentages of the order of 20%, but these result in comparatively high viscosity glasses having Lillie flow points (log viscosity 5) of the order of 250°–300° F. higher than glasses embodying the present invention. Applicants have discovered that the increased fluorescent lifetimes of these improved laser glasses can be largely retained in relatively lower viscosity glasses by use of the oxide of the heavier potassium alkali ion in a percentage weight range of approximately 5–23% combined with the oxide of a lighter alkali ion comprised by sodium used in a weight range of approximately 3–20% or lithium used in a weight range of approximately 0–2% or mixtures of these lighter alkali ions, the total of the alkali oxide elements being used in the range of approximately 18–25 weight percent.

It is an object of the present invention to provide relatively fluid silicate glass laserable materials suitable for fabrication of laser elements or components and exhibiting significantly longer fluorescent lifetimes than can readily be attained in prior materials of comparable viscosity.

It is a further object of the invention to provide silicate glass laserable materials exhibiting both improved lifetimes for fluorescent emission and sufficiently low viscosities as substantially to facilitate the material processing by conventional techniques.

It is an additional object of the invention to provide improved low-viscosity silicate glass laserable matrials having trivalent neodymium providing a source of active laserable ions.

Other objects and advantages of the invention will appear as the detailed description proceeds in the light of the accompanying drawing in which:

FIG. 1 represents an energy level diagram used in explaining a desirable operational characteristic attainable by a laserable material embodying the present invention; and FIG. 2 graphically represents values of fluorescent lifetime, for various molar percentages of individual monovalent alkali ions attainable according to the invention of the aforementioned copending application and here shown for comparative purposes in relation to the comparably high fluorescent lifetimes attainable by the lower viscosity laserable materials embodying the present invention.

The applicants in the aforementioned copending application disclosed that the fluorescent lifetime $\tau$ of a silicate glass containing an active laser ingredient is substantially increased by use of the heavier alkali monovalent ions and the heavier divalent ions such as cadmium or lead or one or more selected from the alkaline earth group. For example, fluorescent lifetimes in excess of 825 microseconds or better have been attained in trivalent neodymium doped silicate glasses containing potassium, rubidium or cesium and mixtures thereof as compared to fluorescent lifetimes of approximately 500 microseconds in prior trivalent neodymium doped glasses using sodium using sodium as the alkali ion.

In addition to this desirable increase of fluorescent lifetime, two incidental benefits are obtained. One of these is that the concentration of trivalent neodymium ions (i.e. an increase in the number of ions per cubic centimeter of the material) may be significantly increased before the appearance of concentration quenching begins to be evident. For example, concentration quenching in a silicate glass containing monovalent potassium as the alkali ion takes place at approximately 2.5 weight percent of $Nd_2O_3$ whereas by substituting monovalent rubidium for the potassium ion approximately 5 weight percent of $Nd_2O_3$ may be used before concentration quenching sets in. The second incidental benefit concerns the increased ease with which operation of the laserable material as a 4-level energy system is attained. Referring to the energy level diagram of FIG. 1 applicable to a trivalent neodymium doped silicate glass, absorption of pumping photonic light energy from the $^4I_{9/2}$ level to a typical excited state level is represented by the arrow W. Non-radiative transitions represented by the wavy-line arrow S carry the ion to the $^4F_{3/2}$ energy state from which fluoresence originates when the ion emits a quanta of light in going to either the $^4I_{13/2}$, $^4I_{11/2}$, or $^4I_{9/2}$ state as represented by the respective arrows $W_1$, $W_2$ and $W_3$. Depending on the glass composition, these three emissions may either appear as broad bands or they may each appear as double lines. For the compositions that give double lines, each of the three $^4I$ states can be considered to be split into two states. When such a splitting occurs, it is possible to obtain laser action for the transition that terminates in the $^4I_{9/2}$ (2) level. For such an application, it is desirable to have the splitting, E, as large as possible to gain the benefits of a 4-level system. The use of heavy monovalent alkali ions and heavy divalent metal ions facilitate attaining this desirable 4-level energy system with its well-known advantages. For example, a value of E of 450 cm.$^{-1}$ has been attained in a silicate glass by use of rubidium as the monovalent alkali ion and barium as the divalent ion.

With respect to the divalent ions, which are essential in silicate glasses to promote their stability, an increase in their concentration tends to reduce the fluorescent lifetime but the heavier divalent ions such as lead, cadmium, barium or strontium have a lesser effect in this respect as compared to the lighter divalent ions such as calcium or magnesium. Barium is especially desirable in attaining increased fluorescent lifetimes while promoting stability in silicate glasses, and trivalent neodymium doped silicate glasses having long fluorescent lifetimes may include BaO within the range of 0–10 mol percent and desirably include approximately 5 weight percent of BaO. A range of 0–10 mol percentage is suitable for others of the heavier divalent ions useful in the glass composition. MgO and CaO may be used in the range of 0–3 weight percent but use of CaO, for example, if found to decrease the fluorescent lifetime by approximately 0.022 microsecond per each unit weight percent increase of this element.

$La_2O_3$ and $Bi_2O_3$ may also be used in the range of 0–4 weight percent and $Al_2O_3$, $B_2O_3$ and $Li_2O$ may be added in the range of 0–3 weight percent. While these metallic oxides may decrease the fluorescent lifetime of the laserable material to an extent, in general the decrease is not significant in the percentage ranges indicated. For example, $B_2O_3$ and $Al_2O_3$ are found to decrease the lifetime approximately 0.015 microsecond per 1 weight percent while $Li_2O$ decreases the lifetime approximately 0.06 microsecond per 1 weight percent.

The monovalent alkali ions promote longest fluorescent lifetimes in a silicate glass incorporating an active laser ingredient when the mol ratio of the alkali oxide to the silicon oxide is approximately 1/6. This ratio represents approximately 20 weight percent of alkali oxide, a percentage which promotes the objects of the invention without significantly decreasing the glass durability or unduly increasing its coefficient of expansion. FIG. 2 graphically shows the substantial improvement in fluorescent lifetime when the heavier monovalent potassium ion replaces the lighter monovalent sodium ion in a silicate glass, and the further improvement in fluorescent lifetime when the even heavier monovalent cesium and rubidium ions are employed. FIG. 2 also shows that in silicate glass compositions containing more than approximately 10 mol percent of alkali, a given molar percentage of $Rb_2O$ is superior than the same molar percentage of $Cs_2O$ which in turn is better than the same molar percentage of $K_2O$ insofar as an increase of the fluorescent lifetime is concerned. On the other hand, silicate glass compositions containing less than 10 mol percent of alkali attain an increased fluorescent lifetime for a given molar percentage of $Cs_2O$ or $K_2O$ as compared to the same molar percentage of $Rb_2O$. The fluorescent lifetime may be increased even more by employing mixtures of the heavier monovalent ions. For example, a fluorescent lifetime of 830–850 microseconds is attained for glasses containing equal parts by weight of $K_2O$ and $Rb_2O$, while a similar lifetime has been attained by use of equal parts by weight of $K_2O$ and $Cs_2O$, both compositions having a total alkali level in a silicate glass of 20 weight percent.

From the standpoint of maximizing the fluorescent lifetime of a laser component, it would be desirable to have all of the alkali provided by use of cesium or rubidium in relatively large weight percentages of the order of 20%, but these heavy monovalent ions substantially reduce the viscosity of the glass. Since there often may be limitations in the glass maker's ability adequately to process such higher viscosity glasses in the fabrication of laser components, applicants have discovered that the glass viscosity may be significantly reduced in accordance with the present invention by use of sodium oxide in the range of 3–20 weight percent while yet retaining approximately 5–23 weight percent of the heavier monovalent potassium ion. Fluorescent lifetimes of approximately 580 to 700 micro-seconds are then attained while at the same time the Lillie flow points (log viscosity 5) is reduced to the range of 800° C. to 1000° C. In this, the summation of the monovalent alkali ion group should be within the range of approximately 18–25 weight percent. Where a total alkali content of say 18 weight percent is desirable or permissive, for example, 10.9 weight percent may be provided by $K_2O$ and 7.20 weight percent may be provided by $Na_2O$ to attain long fluorescent lifetime of approximately 650 microseconds while at the same time providing a decreased glass viscosity having a Lillie flow point value of 970° C. Thus as will be evident from FIG. 2, a significant improvement in fluorescent lifetime of a trivalent neodymium doped silicate glass may be attained as compared to an optimized quantity of $Na_2O$ used alone in approximately 15 mol percent, and this desirable result is accomplished with significantly reduced glass viscosity.

The active laser ingredient in the glass composition may be provided within a range of weight percentages and by use of numerous lanthanide and actinide elements as more fully disclosed in the above mentioned copending application of Elias Snitzer, Ser. No. 168,012. In particular, the active laser ingredient may have a weight percentage within the range of approximately 0.01% and 30% of the weight of the glass and the laser ingredient may be selected from the group including neodymium$^{+++}$, erbium$^{+++}$, samarium$^{++}$, samarium$^{+++}$, thulium$^{+++}$, uranium$^{+++}$, europium$^{++}$, europium$^{+++}$, praseodymium$^{+++}$, terbium$^{+++}$, holmium$^{+++}$, dyprosium$^{+++}$, ytterbium$^{+++}$, and cerium$^{+++}$, and mixtures thereof.

The following tabulation provides the preferred ranges of oxides in weight percent which may be used in a silicate glass batch and/or constituent composition embodying the present invention:

| | |
|---|---|
| $SiO_2$ | 53–73 |
| $Na_2O$ | [1] 3–20 |
| $K_2O$ | [1] 5–23 |
| $Li_2O$ | [1] 0–2 |
| $BaO$ | 0–12 |
| $Sb_2O_3$ | 0–2 |
| $Al_2O_3$ | 0–3 |
| $ZnO$ | 1–7 |
| $Na_2O_3$ | 1–8 |

[1] The summation of these oxides should be within the approximate range of 18–25 weight percent.

Specific examples of silicate glass laserable materials embodying the present invention have batch and/or constituent compositions tabulated as follows:

| | 1 | 2 | 3 |
|---|---|---|---|
| Wt. percent: | | | |
| $SiO_2$ | 68.10 | 62.00 | 67.10 |
| $Na_2O$ | 7.20 | 6.00 | 7.20 |
| $K_2O$ | 10.90 | 18.00 | 10.90 |
| $BaO$ | 4.80 | 3.00 | 4.80 |
| $Sb_2O_3$ | 1.00 | 1.00 | 1.00 |
| $Al_2O_3$ | 1.50 | 2.00 | 1.50 |
| $ZnO$ | 1.50 | 2.00 | 1.50 |
| $Nd_2O_3$ | 5.00 | 5.00 | 5.00 |
| $Li_2O$ | | 1.00 | 1.00 |
| | 100.00 | 100.00 | 100.00 |
| Fluorescent lifetime, msec. | 650 | 600 | 580 |
| Temp. at log vis., ° C.: | | | |
| 5 | 970 | 860 | 894 |
| 7.6 | 715 | 654 | 670 |
| 12.6 | 515 | 500 | 500 |
| 13.0 | 502 | 466 | 472 |
| 16.2 | 400 | 380 | 390 |
| Index of refraction (n) at micron wavelength: | | | |
| 0.486 | 1.5208 | 1.5286 | 1.5259 |
| 0.589 | 1.5150 | 1.5221 | 1.5198 |
| 0.656 | 1.5170 | 1.5196 | 1.5171 |
| 1.014 | 1.5051 | 1.5123 | 1.5098 |
| 1.060 | 1.5047 | 1.5116 | 1.5093 |
| hermal coefficient $\times 10^{-6}$/° C | 9.6 | 12.4 | 9.7 |

The glass-making raw materials listed in the foregoing glass compositions must be of high purity, and in particular they must be free of contamination by iron or other lements which would cause light absorption at 1.06 micron wavelength if they were present in the finished laserable material. The silica, for example, should not contain more than 5 parts per million of iron as $Fe_2O_3$ while the other raw materials, used in smaller quantities in the batch, should not contain more than 8–10 parts per million of iron as $Fe_2O_3$. These laser glasses may be prepared by fusing the raw materials in a platinum crucible heated in a "Globar" electric furnace. No special atmosphere is necessary in the furnace. The raw materials are mixed intimately and completely in a mixing device that does not introduce any contamination. The mixed batch is loaded into the platinum crucible, or a high purity ceramic crucible which will not contaminate the melt by introducing iron or any other element which will absorb light at 1.06 micron wavelength if present in the finished glass. The crucible should be at a temperature of approximately 1400°–1450° C. when the raw material is charged, the loading operation taking approximately two hours since the level in the crucible drops as the batch materials fuse together to form the glass and thus require the addition of more batch. When the charging of the batch is completed, the temperature of the melt is lowered to approximately 1200°–1300° C. and held at this level until the melt is free of bubbles. The molten glass is then stirred at this temperature for at least one hour to free the melt of striae. The temperature of the glass is then lowered to approximately 1000°–1200° C. where it is maintained for a period of about one hour before casting. The temperature value last recited is suitable for a melt of about 1 lb. but it will be understood that the preferred temperature at casting is a function of the size of the cast with larger casts requiring lower temperatures for control of the glass. The glass may be cast in a cast iron mold, and is transferred to an annealing oven just as soon as it has cooled enough to maintain its shape. The glass is annealed at a temperature of approximately 450°–500° C. for a period of one hour and is then cooled down slowly overnight to room temperature.

It will be apparent from the foregoing description of the invention that a silicon glass laserable material embodying the invention is characterized by substantially improved values of fluorescent lifetime and thus exhibits improved energy storage capacity per unit volume of material, while at the same time is one having significantly reduced processing viscosity. A laserable material embodying the invention accordingly exhibits improved laser characteristics yet may be fabricated by conventional processing techniques and equipments.

While there have been described specific forms of the invention for purposes of illustration, it is contemplated that numerous changes may be made without departing from the spirit of the invention.

What is claimed is:

1. A laserable material consisting essentially of a silicate glass containing a divalent metal oxide content within the range of approximately 0–10 mol percent, said metal being selected from the group consisting of lead, cadmium and strontium, a monovalent alkali metal oxide content within the range of approximately 18–25 weight percent wherein potassium oxide within the range of approximately 5–23 weight percent and a monovalent alkali metal ion selected from the group consisting of sodium and lithium and mixtures thereof make up said monovalent alkali oxide content, and trivalent neodymium oxide within the range of approximately 1–8 weight percent.

2. A laserable material consisting essentially of silicate glass containing a divalent metal oxide content within the range of approximately 0–10 mol percent, said metal being selected from the group consisting of lead, cadmium and strontium, a monovalent alkali metal oxide content within the range of approximately 18–25 weight percent wherein potassium oxide within the range of approximately 5–23 weight percent and sodium oxide within the range of approximately 3–20 weight percent make up said monovalent alkali oxide content, and trivalent neodymium oxide within the range of approximately 1–8 weight percent.

3. A laserable material consisting essentially of silicate glass containing a barium oxide content within the range of approximately 0–12 weight percent, a monovalent alkali metal oxide content within the range of approximately 18–25 weight percent wherein potassium oxide within the range of approximately 5–23 weight percent to increase the fluorescent lifetime of said metal and a monovalent alkali metal ion selected from the group consisting of sodium and lithium and mixtures thereof make up said monovalent alkali oxide content to decrease the molten viscosity of said glass, and an active laser ingredient.

4. A laserable material consisting essentially of a silicate glass containing a barium oxide content within the range of approximately 0–12 weight percent, a monovalent alkali metal oxide content within the range of approximately 18–25 weight percent wherein potassium oxide within the range of approximately 5–23 weight percent and sodium oxide within the range of approximately 3–20 weight percent make up said monovalent alkali oxide content, and trivalent neodymium oxide within the range of approximately 1–8 weight percent.

5. A laserable material consisting essentially of a silicate glass containing a barium oxide content of 4.80 weight percent, a potassium oxide content of 10.90 weight percent, a sodium oxide content of 7.20 weight percent, and a trivalent neodymium oxide content of 5.00 weight percent.

6. A laserable material consisting essentially of a silicate glass containing a barium oxide content of 3.00 weight percent, a potassium oxide content of 18.00 weight percent, a sodium oxide content of 6.00 weight percent, a lithium oxide content of 1.00 weight percent, and a trivalent neodymium oxide content of 5.00 weight percent.

7. A laserable material consisting essentially of a silicate glass containing a barium oxide content of 4.80 weight percent, a potassium oxide content of 10.90 weight percent, a sodium oxide content of 7.20 weight percent, a lithium oxide content of 1.00 weight percent, and a trivalent neodymium oxide content of 5.00 weight percent.

8. A laserable material consisting essentially of silicate glass of the following composition, 53–73 weight percent $SiO_2$, 5–23 weight percent $K_2O$, 0–12 weight percent BaO, 3–20 weight percent $Na_2O$, 0–2 weight percent $Sb_2O_3$, and 0.01–30 weight percent $Nd_2O_3$.

References Cited

UNITED STATES PATENTS

| | | | |
|---|---|---|---|
| 2,097,275 | 10/1937 | Fischer | 252—301.4 |
| 2,099,602 | 11/1937 | Fischer | 252—301.4 |
| 3,177,155 | 4/1965 | Soden et al. | 252—301.5 |
| 3,270,290 | 8/1966 | Maurer | 252—301.4 |

TOBIAS E. LEVOW, Primary Examiner

R. D. EDMONDS, Assistant Examiner

U.S. Cl. X.R.

106—52; 252—301.4